United States Patent [19]

Panzica

[11] 4,218,818
[45] Aug. 26, 1980

[54] METHOD AND APPARATUS FOR STRIPPING ARMATURES

[76] Inventor: Leonard J. Panzica, 1654 W. 5th St., Brooklyn, N.Y. 11223

[21] Appl. No.: 17,438

[22] Filed: Mar. 5, 1979

[51] Int. Cl.$^3$ .............................................. B23P 19/04
[52] U.S. Cl. ..................................... 29/762; 29/426.4
[58] Field of Search ..................... 29/762, 427, 402.04, 29/402.03, 239, 283

[56] References Cited

U.S. PATENT DOCUMENTS

| | | | |
|---|---|---|---|
| 1,608,350 | 11/1926 | Waller | 29/762 |
| 3,010,191 | 11/1961 | McCullough | 29/762 |
| 3,146,520 | 9/1964 | D'Eustachio | 29/762 |

Primary Examiner—Milton S. Mehr
Attorney, Agent, or Firm—Edgar N. Jay

[57] ABSTRACT

A method and apparatus are provided by which the windings of an armature are cut near their opposite ends and then the windings or coil segments are preferably simultaneously forced from all the armature slots. An apparatus is described for carrying out the process in which after the coils have been cut circumferentially at their opposite ends, the armature and an annular array of stripping blades are brought into engagement so that the blades enter the slots of the armature and force the armature coil segments out of the armature slots. In the preferred embodiment the number of stripping blades coincides with the number of armature slots so that a stripper blade enters each slot and forces the coil segments out of all of the armature slots simultaneously. The preferred apparatus also includes a blade guide which maintains the blades in registration with their associated armature slots, the blades being radially spring biased and so shaped that if a blade does engage an obstruction such as the end of the armature core, the blade is free to move radially outward to clear the obstruction. A carriage assembly for carrying the armatures into and out of alignment with the stripper assembly and for securing the armature while it is being stripped are also disclosed.

11 Claims, 9 Drawing Figures

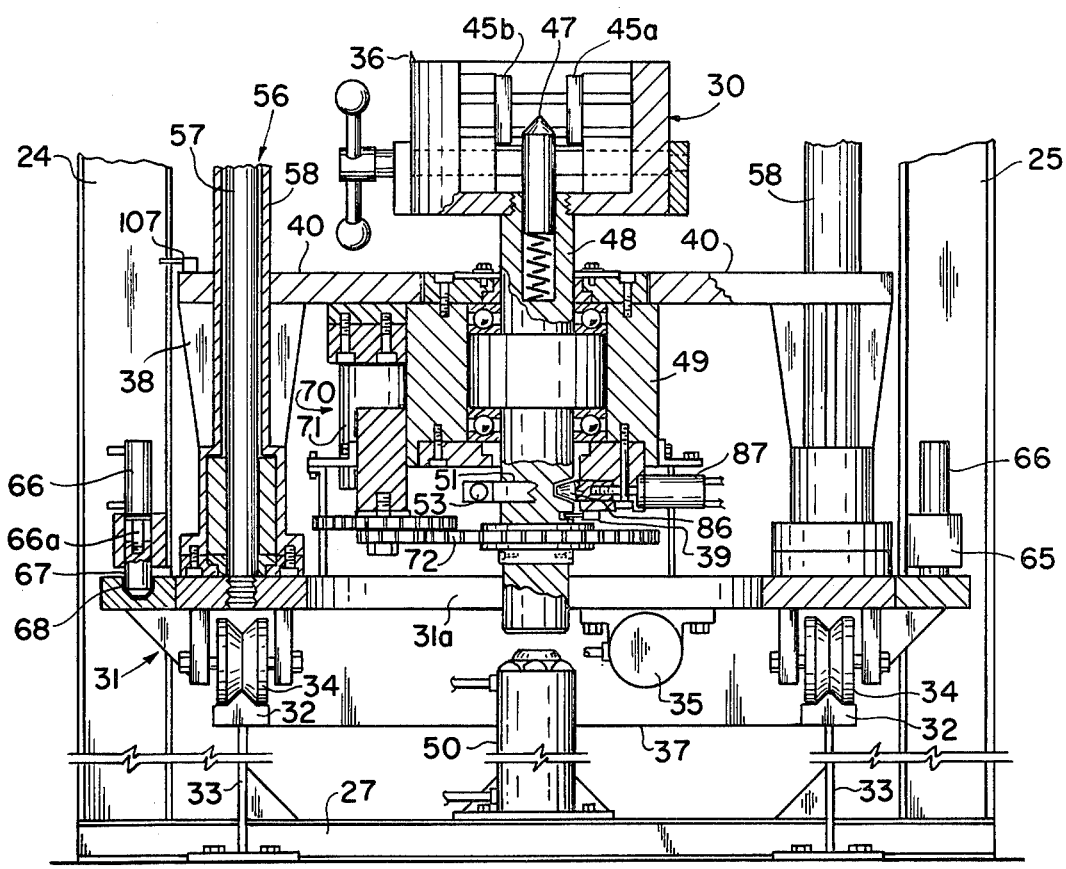
FIG.5
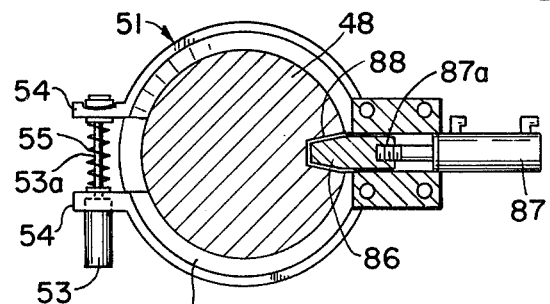
FIG.9
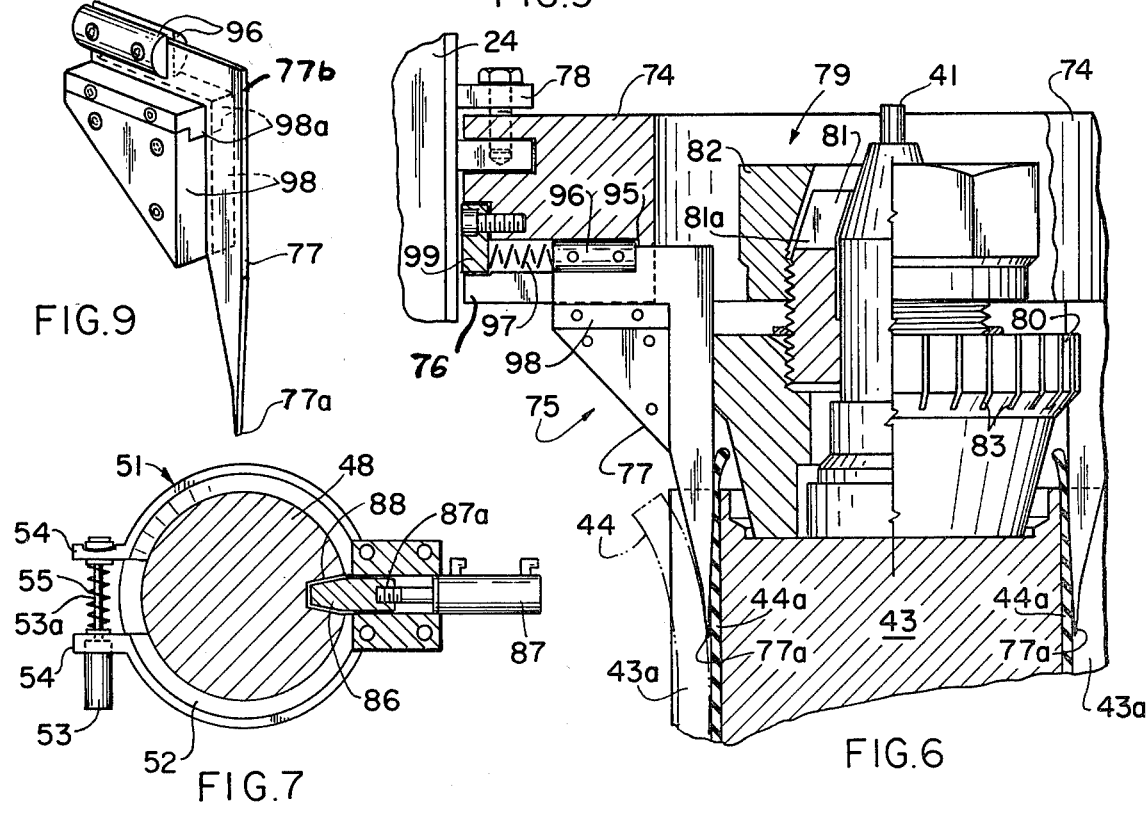
FIG.7
FIG.6

METHOD AND APPARATUS FOR STRIPPING ARMATURES

BACKGROUND OF THE INVENTION

This invention relates to an armature stripper for dynamoelectric machines and, more particularly, to a method and apparatus for stripping the wire coils from such armatures.

The armatures or windings of dynamoelectric machines, such as motors and generators, are mounted for rotation within a magnetic field. The majority of such armatures have a slotted cylindrical core on which wire coils are wound and, at one end thereof each has a number of shaped segments or bars of copper that are assembled in a cylindrical array to form a commutator. The wire coil is wound many layers deep which increases in size and weight with the size of the machine. In time, it may become necessary to strip the coils from the underlying armature core without otherwise damaging the armature, either as a preliminary step to rewinding the core or as part of a salvage procedure. Because of the slotted cylinder core construction, the nature of the coils, and the need to avoid damaging the armature, the stripping procedure hitherto used was time consuming and expensive. Usually the section of wire in each armature slot was individually cut and removed from its slot in a generally manual operation.

SUMMARY OF THE INVENTION

It is, therefore, a principal object of this invention to provide a method and apparatus for rapidly and efficiently removing wire coils from the slotted cores of armatures used in dynamoelectric machines.

It is another object of this invention to provide such a method and apparatus in which all of the coil segments are rapidly substantially simultaneously removed from the armature slots.

It is a further object of this invention to provide such apparatus which lends itself to any desired degree of automation.

In accordance with the present invention, the coils of an armature are cut adjacent their opposite ends, and then preferably all of the coil segments are substantially simultaneously forced from their slots in the armature. In a preferred embodiment of this invention, an armature which is to be stripped and a cutting means are juxtaposed and the cutting means actuated to cut the coils adjacent their opposite ends. The armature and an array of spring-biased blades, preferably with a blade aligned with each one of the longitudinal slots of the armature core, are then displaced relative to each other so that a blade is guided into each slot of the armature core and the segments of the armature coil are each substantially simultaneously pried out of the longitudinal slots of the armature core. In operation, the prying or stripping blades are accurately aligned with the core slots; however, to further ensure against deflection or twisting of a blade in use, means may be provided to maintain proper alignment of the stripper blades with the armature core slots. Means may also be provided to ensure the desired sequence of operation.

BRIEF DESCRIPTION OF THE DRAWINGS

Further objects, as well as advantages, of this invention will be apparent from the following detailed description thereof and the accompanying drawings in which

FIG. 5 is a fragmentary elevational view of the carriage and jacking plate assemblies partially broken away and on an enlarged scale;

FIG. 6 is a fragmentary elevational view partially broken away of the blade holder, blade guide and armature on an enlarged scale;

FIG. 7 is a fragmentary sectional view of the brake assembly on an enlarged scale;

FIG. 9 is a perspective view of a blade assembly.

DESCRIPTION OF THE PREFERRED EMBODIMENT

Figure 1:
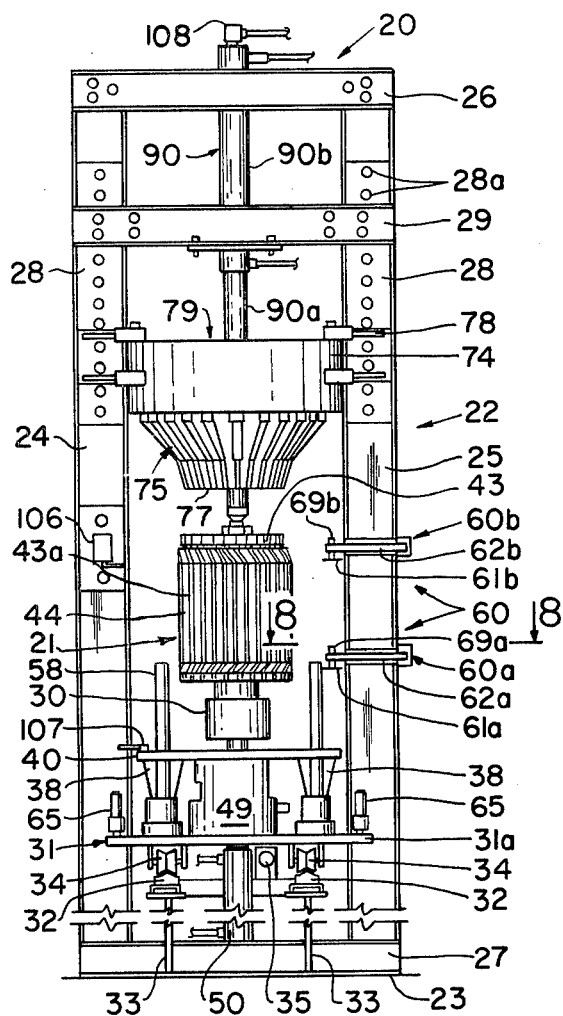
FIG. 1 is a front elevational view of an armature stripping apparatus constructed in accordance with this invention.

Referring to the drawings in detail, and in particular to FIGS. 1, 2, 5, and 6, armature stripper 20 is shown with an armature 21 mounted thereon in position for stripping. Stripper 20 comprises a frame assembly 22 having a base 23, bottom beams 27 mounted thereon and vertically extending side beams 24 and 25. Top beams 26 interconnect the upper ends of the side beams 24 and 25. A lift device such as a hydraulic jack 50 is mounted on the base 23 and is extendable vertically upward as will be more fully described hereinafter. A pair of parallel rails 32 are supported on a plurality of support members 33 spaced along base 23. A carriage assembly 31 having a platform or base 31a is movable along rails 32 into and out of stripping position within frame 22. Preferably motive means such as a hydraulic cylinder 35 is connected to and carried by the carriage base 31a and has its piston 35a connected to a bar 37 which is in turn connected to rails 32 for moving the carriage assembly 31. As shown the base 31a of carriage assembly 31 is movably supported on rails 32 by wheels 34. Each of the side beams 24 and 25 has mounted thereon a lock 65 comprising a hydraulic cylinder 66 having a movable piston 66a therein connected to a locking pin 67 which engages in a locking pin recess 68, formed in the base 31a, when the carriage assembly 31 is in its stripping position. The base 31a has a central opening for the hydraulic jack 50 to extend therethrough when carriage assembly 31 is in its stripping position. Four guide assemblies 56 (FIG. 5) are mounted on the upwardly presented side of base 31a and each comprises a guide rod 57 connected to base 31a and a guide rod casing 58 telescoping over and in sliding engagement with the guide rod 57. Suitable lubrication including grease, bushings and seals may be provided in the rod casings 58. Support members 38 mounted on guide casings 58 are connected to and support a jacking plate 40 parallel to and above base 31a.

A central axially extending shaft 48 is rotatably connected to jacking plate 40 and extends upward through a central opening in plate 40 and, when the latter is in its lowermost position, through the central opening of base 31a. Rotation assembly 70 for rotating shaft 48 comprises a motor 71 connected to and supported by jacking plate 40 and, when energized, rotates shaft 48 through a suitable gear drive 72. In the preferred embodiment as shown in FIGS. 5 and 7, shaft 48 is rotatably supported by means of suitable bearings within a generally cylindrical support member 49. Brake 51 has braking surfaces 52 which extend around the shaft 48 and is operated by a hydraulic cylinder 53 fixed to the support member 49 which has a piston 53a movable therein and connected to flanges 54 of the braking surfaces 52. The arrangement is such that when piston 53 is retracted, the flanges 54 are brought toward each other so that the braking surfaces 52 engage the shaft 48 bringing it to rest. A spring 55 mounted between the flanges 54 normally maintains the brake 51 disengaged leaving the shaft 48 free to rotate when the piston 53a is in its extended position. A shaft locking means has a pin 86 connected to piston 87a movably mounted in a hydraulic cylinder 87 which is in turn fixed to support member 49. Locking pin 86 seats in slot 88 in shaft 48 to lock the shaft 48 in a predetermined stopped or rest position.

Clamping means preferably in the form of a self-centering vise 30 is fixed to the upper end portion of shaft 48 which extends above the jacking plate 40 as is most clearly shown in FIG. 5. Vise 30 comprises two movable jaws 45a and 45b and a springloaded centering pin 47, the latter being mounted in the lower portion of the vise 30 coaxial with the shaft 48. Vise 30 is provided with a convenient zero or bench mark 36 to facilitate alignment of an armature clamped in the vise.

Figure 2:
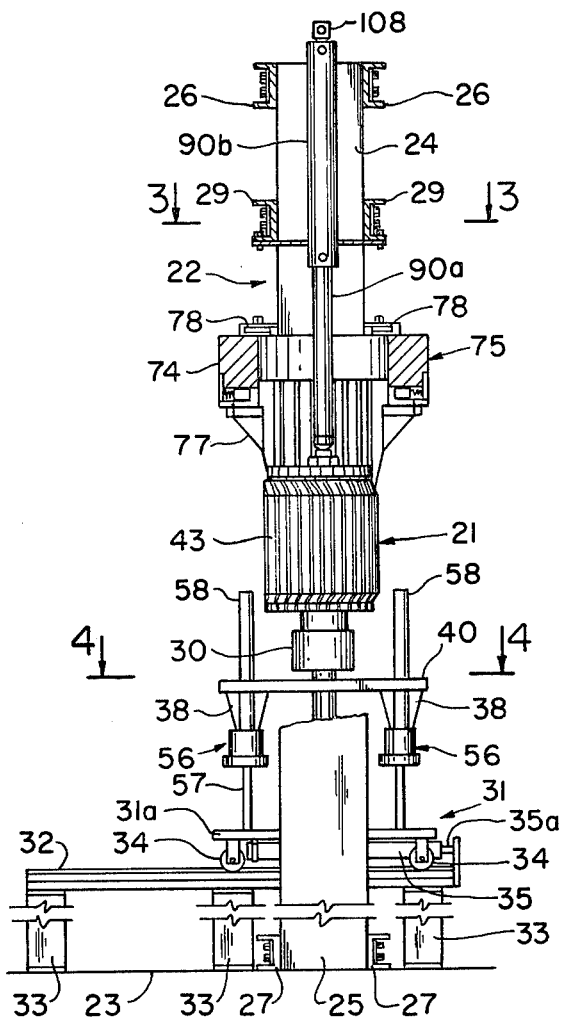
FIG. 2 is a side elevational view of the apparatus partially cut away.
Figure 3:
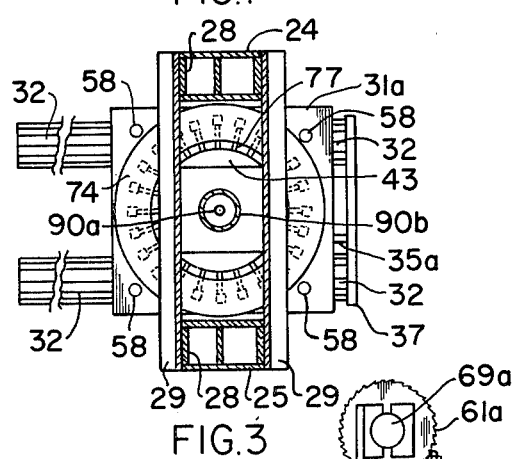
FIG. 3 is a sectional view cut along line 3—3 of FIG. 2 in the direction indicated.

As best shown in FIGS. 1, 2 and 3, an armature 21 mounted in the armature stripper 20 may be further stabilized, when carriage 31 is in stripping position, by engaging the upwardly presented end of shaft 41 of the armature 21 with a piston or ram 90a, of an upper hydraulic assembly 90 the cylinder 90b which is connected to the top beams 26. The ram 90a having a free-wheeling center which, when extended downward, contacts central armature shaft 41. To accommodate armatures of widely different axial length, the upper hydraulic assembly 90 when present is fixed to a support member 29 which in turn is removably connected adjacent its opposite ends as by bolts, to elongated plates 28 fixed to the side beams 24 and 25 and having a number of aligned holes 28a formed therein. In the preferred embodiment shown, the upper end of cylinder 90b communicates with the low pressure side of the source of hydraulic fluid through a pressure control valve 108 set for a pressure level, e.g. 2000 psi, which is small compared to the operating pressure of jack 50. During normal operation, the input side of the cylinder 90b is connected to the source of fluid under pressure (not shown) and maintains the preset pressure on the upper end of armature shaft 41, thereby functioning as a hydraulic spring against which the lower jack 50 works when energized to move the armature 21 upward. The specific structure of valve 108 and its connection to the low pressure side of the source of pressure fluid form no part of the present invention and are therefore, schematically indicated in the drawing.

Figure 8:
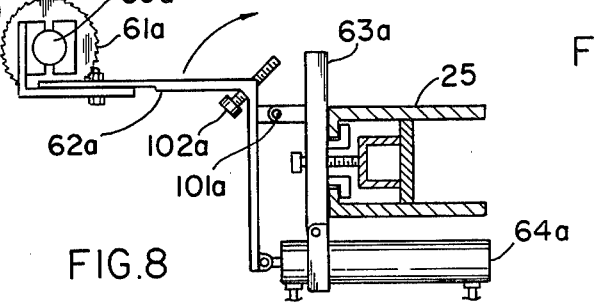
FIG. 8 is a fragmentary sectional view along the line 8—8 of FIG. 1 showing a coil cutting assembly.

Movably mounted on the side beam 25 of the frame 22 is coil-cutting means 60 comprising, two cutting assemblies 60a and 60b (FIGS. 1 and 8) movable to adjust the distance between them to accommodate armatures 21 of different axial length. The cutting assembly 60b has the same structure as cutting assembly 60a and the parts thereof are indicated by the same reference characters as those used for 60a with the substitution of the suffix "b" for the suffix "a". As is most clearly shown in FIG. 8, coil-cutting assembly 60a comprises a plate 63a clamped on side beam 25. An L-shaped lever 62a is pivotally connected to the plate 63a as indicated at 101a. A hydraulic cylinder 64a is hinged to plate 63a with its piston positioned to engage and actuate one end of L-shaped lever 62a. Connected to the other end of L-shaped lever 62a is a member such as a blade 61a driven by a motor 69a which may be pneumatically driven. A stop screw 102a threaded through L-shaped lever 62a by engaging plate 63a serves to limit the arc through which L-shaped lever 62a can rotate when actuated by the piston of hydraulic cylinder 64a. When the coil-cutting assembly 60 is actuated, L-shaped levers 62a and 62b move the cutting blades 61a and 61b with the blades energized into contact with the armature 21. The coil-cutting assemblies 60a and 60b are adjusted for each size armature to be stripped so that the blade 61b is aligned with the upper end portion of the armature windings, and blade 61a is aligned with the lower end portion of the armature windings. In the usual case of armatures with two interlocked sets of windings, the stop 102a is adjusted to permit the blade 61a to cut through both the armature windings adjacent to the bottom end of the armature and the stop 102b and permits the cutting blade 61b to cut through the outer layer of the coils adjacent the upper end of the armature to permit separation of the interlocked coils. As will be more fully pointed out, once the L-shaped levers 62a and 62b have rotated so that stop screws 102a and 102b engage their stops, the armature 21 undergoing stripping is rotated. This rotation of the armature 21 serves to translate the windings relative to the rotating blades 61a and 61b so that the cuts are made about the entire circumference of the armature 21. When rotation of the armature 21 has completed the cutting of the windings, the armature 21 is returned to its latched position with the locking pin 86 seated in its slot 88 thereby securing the armature 21 in its predetermined position.

Means for stripping the severed windings from the slots of the armature core 43 preferably comprises an annular blade array 75 having a cylindrical blade holder 74 connected to and supported between the side beams 24 and 25 coaxially aligned with the shaft 48. Blade holder 74 is conveniently connected to the side beams and so as to permit vertical adjustment of its position above an armature 21 supported in vise 30. To that end, a pair of mounting brackets 78 are bolted to the plates 28 on beams 24 and 25 to which the blade array 75 is removably fixed. Adjustment of the brackets 78 along plates 28 on the beams 24 and 25 serves to shift the blade assembly 75 a corresponding amount up or down, to facilitate the accommodation of armatures 21 of different axial length.

A given annular blade array 75 may be used with armatures of different axial length so long as they have similar arrays of slots in their cores; such armatures being designated here for convenience as being of the same type. Thus, a given annular blade array 75 is constructed for use with armatures of a given type and its blade holder 74 has a plurality of radially extending slots 76, one of which is most clearly shown in FIG. 6, in each of which a blade assembly 77 is positioned for alignment with each of the slots of the armature 21 to be stripped. The blade holder 74 has a counter bore 95 formed radially along the outer portion of each of its slots 76 to receive brass slides 96 fixed to each blade 77 along its upper radially outer end portion as shown in FIG. 6. The radially inner end of the brass slides 96 serve to engage the radially inner end of the associated counter bore 95 and thereby limit the radially inward movement of its blade 77. A spring 97 is retained by a plate 99 in each counter bore 95 and bearing against the outer ends of slides 96 serves to urge its associated blade 77 to its radially innermost position. The arrangement is such that each blade 77 can be forced to move radially outward a limited amount and compress its spring 97 so as to minimize the likelihood of damage to an armature core 43 as will be more fully pointed out hereinbelow. In addition, the radially inner extreme position of each blade 77 or all of them can be readily shifted more or less radially outward by inserting slotted spacers of the appropriate thickness into the counter bores 95. This effectively increases the length of the slides 96.

Each blade assembly 75 preferably also includes a pair of side members 98, which may be essentially triangular and are conveniently bolted to opposite sides of each blade 77 adjacent to the upper end thereof. The side members 98 may be recessed along their upper edges to accommodate brass members 98a which extend radially along each blade assembly 77 spaced below the slides 96 so that the members 98a may engage the downwardly presented surface of the blade holder 74. The arrangement is such that the slides 96 and members 98a serve to engage and guide the blade assemblies 77 in the blade holder 74 and in the event they should wear in use, can be readily replaced. As is most clearly shown in FIG. 6, each blade 77 is preferably elongated, from top-to-bottom and is tapered radially to a well defined tip 77a. Between the radially inner portion 77b at its upper end and its tip 77a at its lower end, each blade 77 is somewhat curved so that the tip 77a does not extend as far radially inward as does the upper inner portion 77b. In operation, the blade tips 77a first engage the winding insulation 44a and if any part of the blade 77 engages the core 43 when the stripping means and armature are brought into engagement, it is the inclined portion of the blade above its tip 77a. As is most clearly shown in FIG. 6, the lower portion of each blade is generally wedgeshaped and the radially outwardly presented surface of each blade 77 extending upwardly from its tip 77a forces each coil segment of the winding 44 out of its slot 43a.

When necessary or desired to maintain registration of the stripping blades 77 with their corresponding armature core slots 43a, a blade guide assembly 79 is mounted on the shaft 41 of the armature 21, adjacent to the upper end thereof as viewed in FIG. 6. Blade guide assembly 79 comprises a guide head 80 formed with a plurality of slots 83, one for each of the blades 77. The thus-formed annular array of slots 83 preferably have a depth or radial length such that their radially inner ends fall on a circle the radius of which is substantially equal to or slightly greater than that of the armature core slots 43a. The guide head 80 is conveniently retained on the armature shaft 41, after it has been oriented with its slots 83 aligned with the armature slots 43a, by means of an externally threaded clamping and retaining ring 81 and a lock nut 82, the latter having an internally tapered portion which bears against and compresses the free end of ring 81 into clamping engagement with the shaft 41, the ring 81 being slotted for that purpose as indicated at 81a.

In use, the armature stripper 20 may be arranged, if desired, so that each of its power means whether hydraulic, pneumatic or electrical, is energized and de-energized manually. The apparatus also lends itself to varying degrees of automation and, if desired, may be fully automated. That is to say that once an armature is mounted in vise 30 on carriage 31 and the piston 35a is actuated to move the carriage 31, with the armature 21 mounted thereon, into position beneath the blade assembly 75, actuation and deactuation of the upper ram 90a, core cutting assemblies 60a and 60b, jack 50 and the rotation assembly 70, in the required sequence need not require any further actions by the operator. However, as is preferred, stripper 20 as shown and described operates semi-automatically. Certain steps are initiated by the operator and are automatically terminated on completion. Electrical control circuits for actuating and controlling motors of various types, e.g. electrical or pneumatic, and hydraulic motive means are well known and do not require detailed description here. However, it should be noted that in operation, with carriage 31 to the left as viewed in FIG. 2, it is in its starting position with piston 35a extended to the right from its cylinder 35.

An armature 21 to be stripped is conveniently provided with a base or zero line by marking it vertically from top to bottom along the center of one of the coil segments. The armature 21 is then mounted in vise 30 with the base line aligned with mark 36. In this way, complete revolution of the armature about its vertical axis or accidental rotation which might lead to the armature being damaged can be readily detected. With the armature 21 clamped in vise 30, the blade guide assembly 79 is mounted on the armature shaft 41 and locked in place with its slots 83 aligned and centered with the armature slots 43a.

The carriage assembly 31 with the armature 21 clamped thereon is now ready to be shifted from its starting position into stripping position. The operator actuates the carriage hydraulic drive by completing a circuit (not shown) between the right end of cylinder 35 and a source (not shown) of fluid under pressure, causing the cylinder 35 to be urged to the right relative to the piston 35a; carriage base 31 and cylinder 35 being connected, the carriage base 31 is driven to the right (FIG. 2) until the carriage is in the stripping position with pins 67 aligned with their recesses 68 in carriage base 31a. To ensure positive locking of the carriage in its stripping position, the operator actuates the hydraulic latching means 66, 66a to seat pins 67 in their recesses 68. The armature 21 is now coaxially aligned with the blade holder 74 and blade assembly 75. If desired, the upper end of cylinder 90b is now connected to the source of hydraulic fluid under pressure to drive ram 90a down into engagement with the upper end of armature shaft 41.

With the armature 21 rigidly supported in position beneath the stripping blade assembly 75, the operator now actuates the coil cutting means 60 to energize blades 61a and 61b and bring the rotating blades 61a and 61b into engagement with the upper and lower ends of the windings 44. As was pointed out hereinabove, the stop screws 102a and 102b are adjusted to permit the lower blade 61a to cut substantially through both windings of an armature with two windings and the upper blade 61b to cut through the outer winding. With the blades 61a and 61b still being driven, the operator now actuates the rotation assembly 70 to rotate the armature 21 through one complete revolution, limit switch 39 (FIG. 5) being located to ensure that the armature 21 is brought to a stop by brake 51 with its base line aligned with vise mark 36 and brake lock pin 86 seated in its recess 88.

The windings having been cut circumferentially adjacent to their opposite ends, the armature 21 is now in condition to receive the stripper blades 77 which force the coil segments of the windings out of the armature slots 43a. The lower hydraulic jack 50 is now actuated to raise the jacking plate 40 with the armature 21 in vise 30 for coaction with the blade assembly 75. As shown, the operator actuates the hydraulic circuit to connect the lower end of the cylinder of jack 50 to the source of pressure fluid (not shown) and drive its piston upward to engage the lower end of shaft 48 to raise it upward. Shaft 48 carries the jacking plate 40 upward and the latter is maintained in proper alignment relative to the blade holder 74 by the guide assemblies 56. The inner diameter of the blade holder 74 provides sufficient clearance for the armature 21 so that it can encircle the armature 21 without impeding relative movement between them. As the armature 21 is raised by the upward motion of shaft 48 under the influence of jack 50, the tips 77a of the stripper blades 77 enter the corresponding blade guide slots 83 and then engage the windings 44, preferably being so aligned that each blade 77 engages the winding in the aligned slot where it rests against the insulation 44a provided in the bottom of each slot 43a. Continued upward movement of the armature 21 causes each of the stripper blades 77 to continue downward relative to and behind the windings 44. At the same time the backs, or radially outer surfaces of the blades 77 function as wedges to force the winding segments out of their slots. The insulation 44a may also be forced out of the slots at this time but once the windings are removed such insulation as may remain can be easily removed when the armature is prepared for rewinding. When the blades 77 have completed their travel through the armature slots 43a, or the armature has reached the end of its upward displacement, switch actuator 107 mounted on jacking plate 40 engages microswitch 106 to stop the upward movement of the armature 21 by deactivating jack 50.

Figure 4:
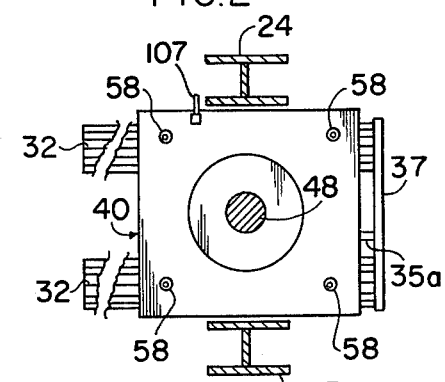
FIG. 4 is a sectional view along line 4—4 of FIG. 2.

It is to be noted that microswitch 106 which functions as a limit switch is mounted on side beam 24 (FIGS. 1 and 4) so that it can be readily shifted upward or downward the amount required to ensure that the travel of jacking plate 40 is that required for proper operation. It should also be noted that while jack 50 is raising the armature 21, the upper ram 90a is also forced upward thereby forcing pressure fluid through the valve 108 from the cylinder 90b.

Stripping having been completed, the return line from jack 50 if not open is opened by the operator and ram 90a, which has remained under pressure, now drives the armature core 43 and jacking plate 40 to their lowered positions. When the jacking plate 40 has come to rest on the carriage base 31a, the piston of jack 50 continues down to its bottom position. The operator now once again actuates the hydraulic drive 35, this time to connect the left end (FIG. 2) of its cylinder to the source of pressure fluid so that the cylinder and the carriage assembly 31 to which it is anchored, are driven to left back to the starting position where the stripped armature core can be removed and a fresh armature to be stripped is mounted.

The method and apparatus for stripping windings from armatures in accordance with the present invention makes it possible to substantially reduce the cost and time required. Armatures can now be stripped with little or no risk of damage. In fact, the mounting and manipulation of the armature and its windings are so conducted that armatures stripped in accordance with the present invention will be in better condition for further processing and rewinding.

It is not intended by describing specific instrumentalities such as hydraulic motive means or electrically or air driven motive means to thereby limit the present invention. It is also recognized that wide variations and modifications can be made in the method and apparatus described herein for the purpose of exemplifying the present invention without departing from the present invention as claimed. Thus, in carrying out the preferred embodiment of the present invention, the number of blades is equal to the number of slots in the slotted armature core but it is also contemplated that the set of stripper blades while comprising a plurality of blades may be made up of a number of blades that is less than the number of slots. In that event, the array of blades and the armature are brought together more than once and one or the other is stepped, as by rotating the same to bring the blades into registration with unstripped slots. Furthermore, the materials from which the various parts of the present apparatus are formed are not critical. Suitable materials depending upon the size and forces generated or required to be sustained will be apparent to one of ordinary skill in constructing equipment. For example, a suitable material for the wedge shaped blades 77 for use in stripping the larger armatures is a tool steel having good strength and toughness such as AISI Type A6 or Type H13. Other suitable materials will suggest themselves.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed.

I claim:

1. Apparatus for stripping a wound slotted member such as an armature having coil segments extending in its slots, comprising stripping means including a plurality of stripping blades supported in an array relative to an axis, with each blade spaced a predetermined distance from said axis, means for supporting a wound slotted member coaxially with said array of stripping blades, means for cutting the winding circumferentially about the slotted member to cut the coil segments extending in the slots of the slotted member, and means for mutually displacing said slotted member and said array of blades toward each other so that each of said blades enters a slot of the slotted member and forces the coil segment out of the same.

2. An apparatus as set forth in claim 1 in which said stripping blades are each movable outward from an extreme inward position, and means biasing said blades toward their inward positions.

3. An apparatus as set forth in claim 1 or claim 2 in which guide means are removably mounted coaxially with said slotted member, said guide means having a plurality of slots for alignment with the slots of said slotted member and for receiving said blades.

4. An apparatus as set forth in claim 1 which comprises means for rotating said slotted member while said winding is being cut.

5. An apparatus as set forth in claim 4 in which said cutting means includes two cutting members, and means movably supporting said cutting members for movement toward and away from said slotted member between two extreme positions the inner position being effective to cut to a predetermined depth into said winding, means for driving said cutting members and for selectively moving the same between their said extreme positions, and said cutting member support means being axially movable for aligning said cutting members with the opposite ends of the winding on a slotted member.

6. Apparatus as set forth in claims 1, 4 or 5 in which said stripping blades are supported in an annular array, said stripping means further comprising a blade holder having an opening therethrough entending coaxial with and having a diameter larger than the inner diameter of said annular array, said blade holder having an annular array of slots formed therein one for each of said blades and communicating with said blade holder opening, said blades each being radially movable in its blade holder slot between an extreme radially inner position and an outer position, and resilient means biasing said blades toward their radially inner position.

7. Apparatus as set forth in claim 6 in which the number of blades in said annular array is equal to the number of slots in said wound slotted member with the blades aligned to substantially simultaneously enter all the slots of the wound slotted member and substantially simultaneously force the coil segments out of all of its slots when said wound slotted member and said annular array of blades are displaced toward each other.

8. Apparatus as set forth in claim 7 in which said means for supporting said wound slotted member includes means for rigidly engaging one end of said wound slotted member, and means for resiliently engaging the other end of said slotted member thereof while leaving it free to rotate.

9. Apparatus as set forth in claims 1, 4 or 5 in which each of said blades is substantially wedge shaped with its tip leading when said array of blades and said wound slotted member are displaced toward each other, the inwardly presented surface of each of said blades forming the base of said wedge with a portion of said base being inclined or curved so that said tip is displaced radially outward relative to the remainder of the base of said wedge.

10. Apparatus as set forth in claim 7 in which each of said blades is substantially wedge shaped with its tip leading when said annular array and said wound slotted member are displaced toward each other, the radially inwardly presented surface of each of said blades forming the base of said wedge with a portion of said base being inclined or curved so that said tip is displaced radially outward relative to the remainder of the base of said wedge.

11. Apparatus as set forth in claim 8 in which each of said blades is substantially wedge shaped with its tip leading when said annular array and said wound slotted member are displaced toward each other, the radially inwardly presented surface of each of said blades forming the base of said wedge with a portion of said base being inclined or curved so that said tip is displaced radially outward relative to the remainder of the base of said wedge.

* * * * *